United States Patent [19]

Hocker

[11] 4,188,910
[45] Feb. 19, 1980

[54] COMBINED MILK FLOW SENSING AND VACUUM SHUT-OFF DEVICE

[76] Inventor: Van G. Hocker, R.D. #4, Box 300, Carlisle, Pa. 17013

[21] Appl. No.: 892,840

[22] Filed: Apr. 3, 1978

[51] Int. Cl.$^2$ .............................................. A01J 7/00
[52] U.S. Cl. .................................................. 119/14.08
[58] Field of Search ................. 119/14.08, 14.1, 14.13, 119/14.05, 14.46

[56] References Cited
U.S. PATENT DOCUMENTS

| | | | |
|---|---|---|---|
| 3,986,482 | 10/1976 | Novak | 119/14.08 |
| 3,991,716 | 11/1976 | Reisgies | 119/14.08 |
| 4,005,680 | 2/1977 | Lole | 119/14.08 |

*Primary Examiner*—Hugh R. Chamblee
*Attorney, Agent, or Firm*—Philip D. Freedman

[57] ABSTRACT

A combination milk flow sensing and vacuum shut-off device comprises a housing defining a milk flow cavity with an inlet port through which milk can flow in freely as it comes from the teat cups and an outlet port of sufficient size such that milk can flow freely out of the milk flow cavity and not accumulate therein; a plunger within the milk flow cavity is suspended by means of a stem extending out of the cavity and attached to and operated by an air pressure cylinder piston unit in such a relationship that the piston unit drives the stem and plunger vertically within the milk flow cavity so that the cut-off plunger may engage with the seat of the milk flow outlet port to cut off milking vacuum or to disengage the seat of the port to admit vacuum; a milking sensor pedal is provided within the cavity and suspended directly beneath the inlet port by means of a pedal shaft extending through the wall of the cavity to support the pedal. The pedal shaft is pivotally mounted. A counter weight assembly is attached to the end of the pedal shaft and mounted outside of the cavity to pivot with the motion of the sensor pedal and pedal shaft as the pedal is activated by flow from the inlet port; a valve closure member is attached by means of a flexible member to the top of the pivotally mounted rocker shaft assembly so that deflections of the milk sensor pedal are transferred to impart a resulting pivotal rocking motion through the rocker shaft assembly and the flexible member to cause the valve member to open and close.

6 Claims, 5 Drawing Figures

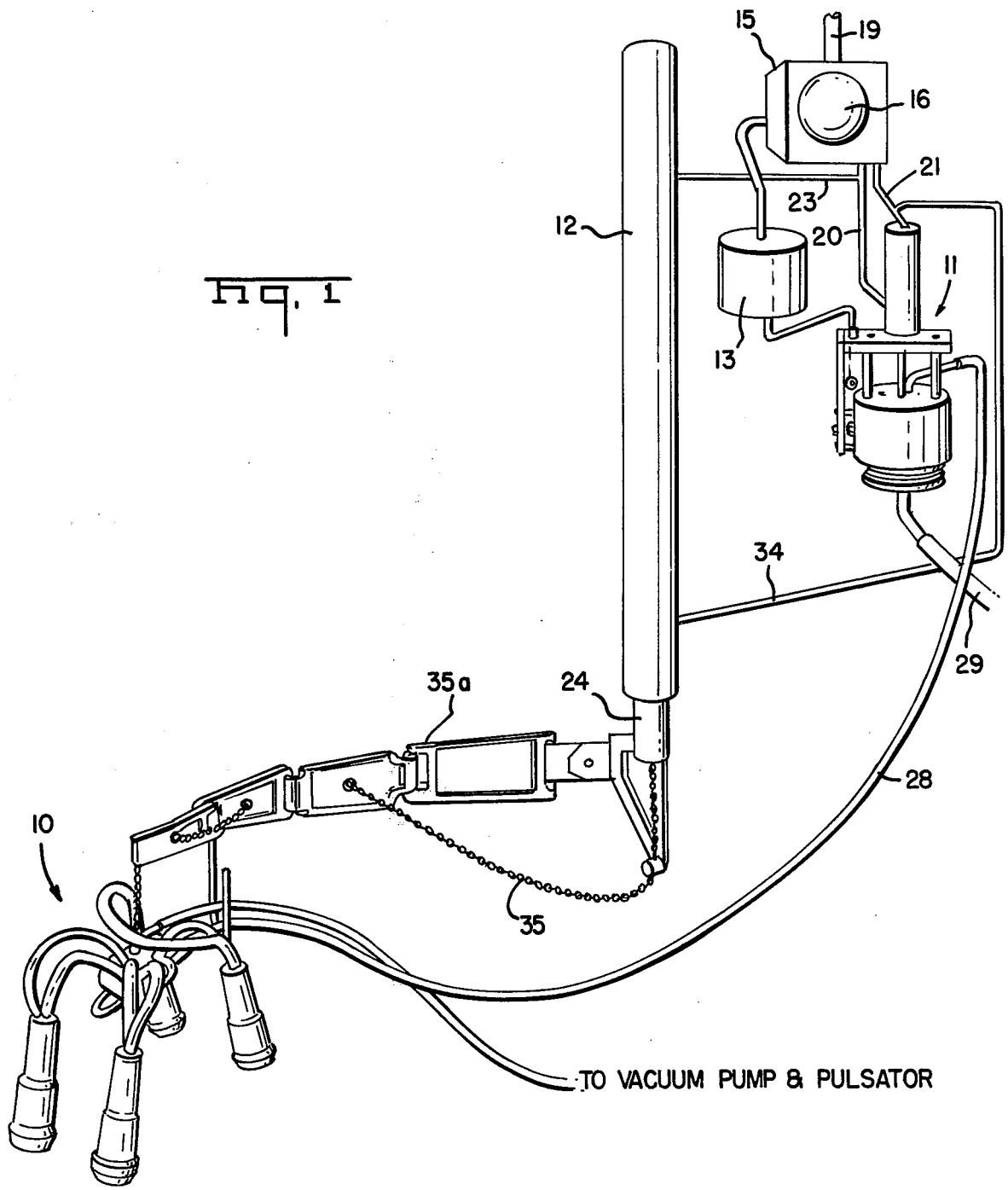

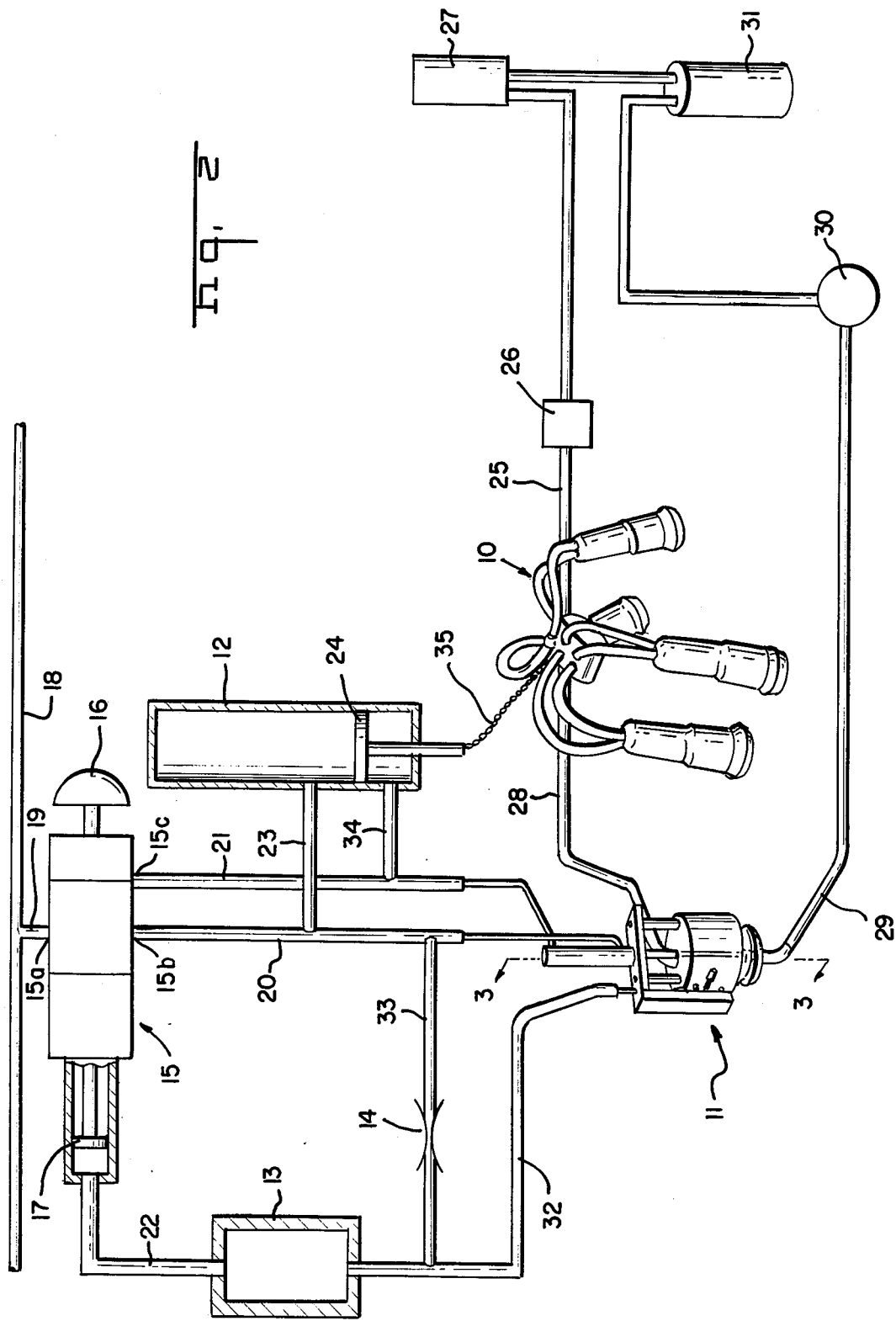

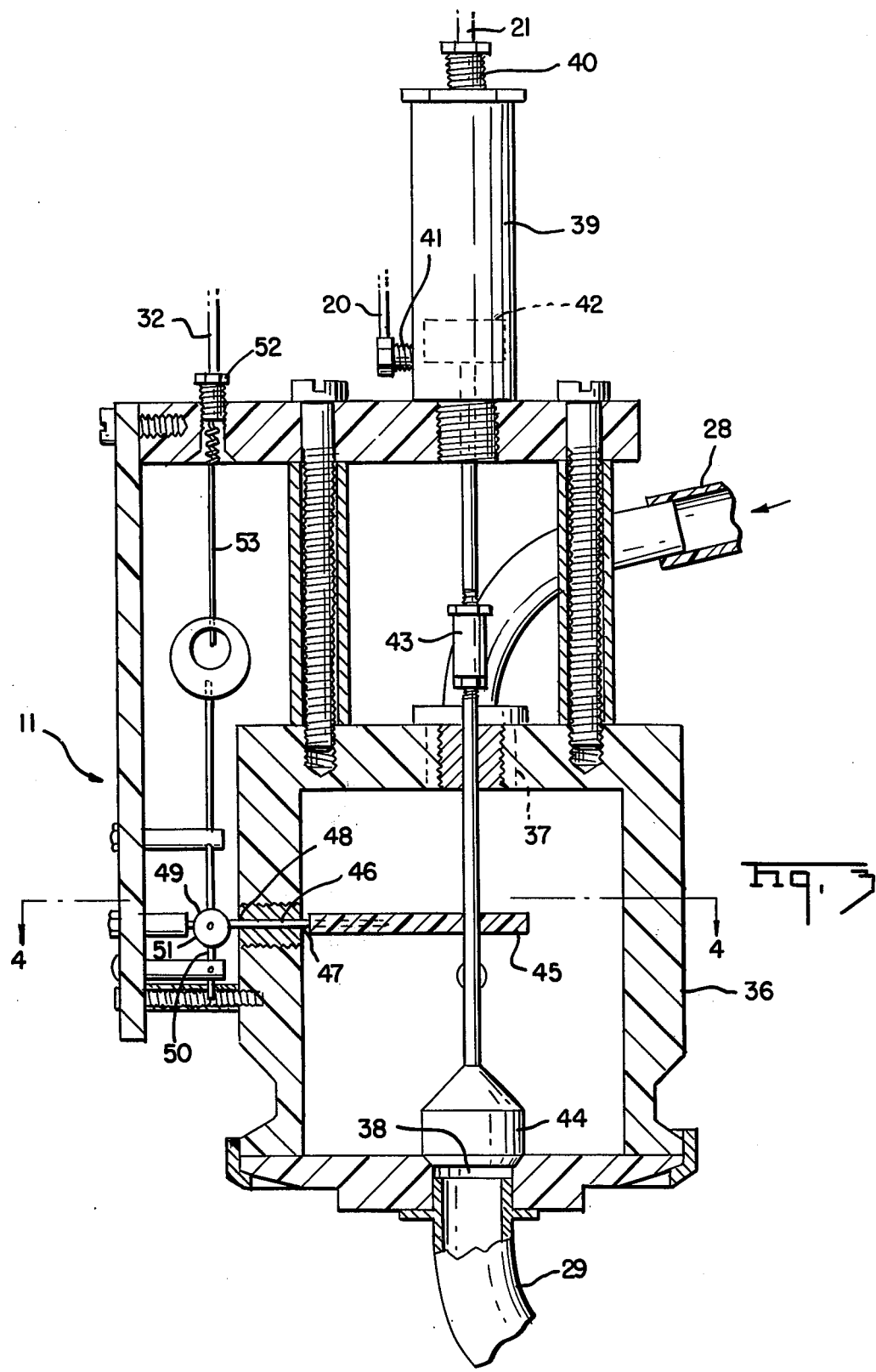

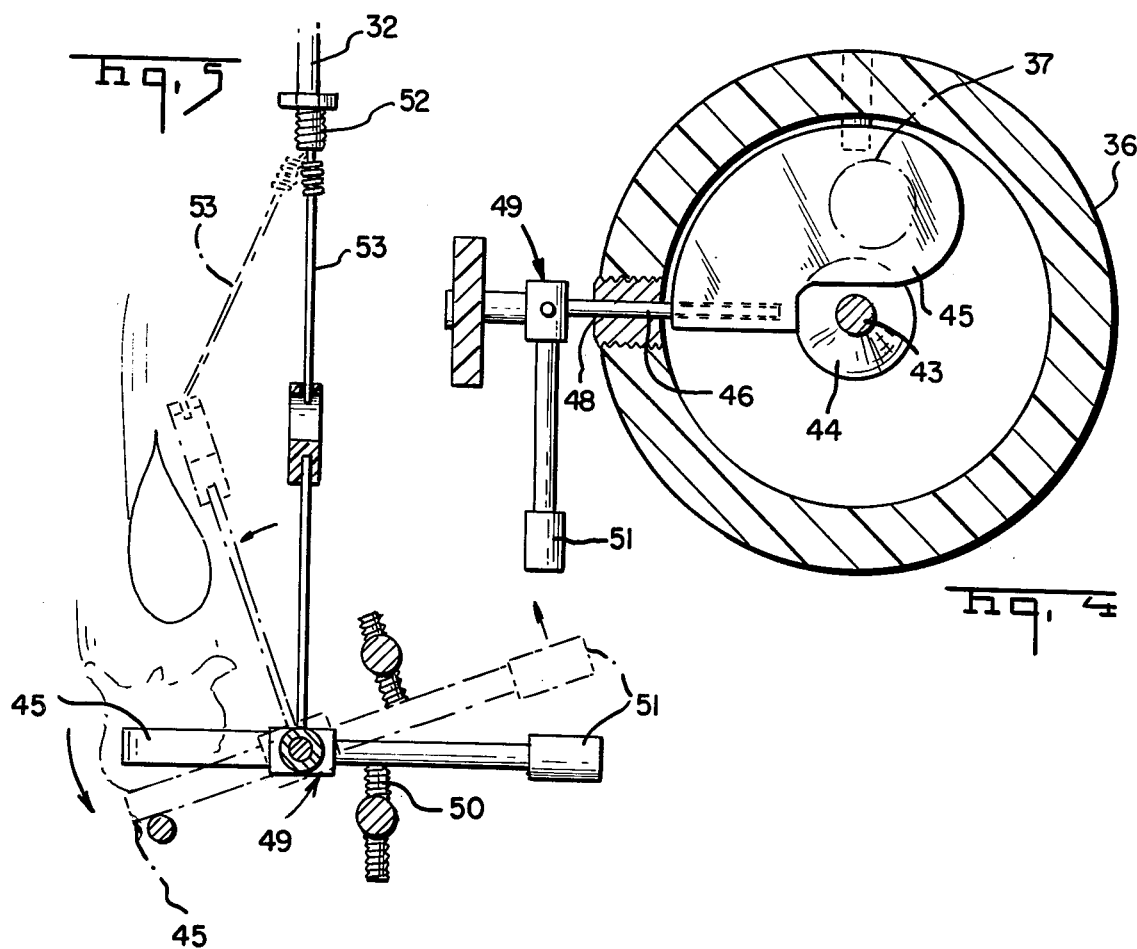

COMBINED MILK FLOW SENSING AND VACUUM SHUT-OFF DEVICE

This invention relates to automatic milking machines and specifically to an improved combination milk flow sensing and vacuum shut-off device that is used in conjunction with apparatus for automatically detaching teat cups from the udder of a milking animal after completion of the milking process.

These milking machines operate by applying a vacuum to the teat end to create a pressure differential across the teat canal. Prior to the stimulation of the vacuum, the internal pressure of the udder is nearly equivalent of atmospheric pressure. Stimulation results in milk let-down and a positive pressure in the gland. Vacuum is applied to the end and milk is removed.

Such machines, in order to be fully automatic, require a device to sense the flow of milk from the animal and to shut off the vacuum to the teat cups and detach the cups from the animal udder upon completion of the milking process. These sensing devices come in a variety of forms based on an assortment of sensing mechanisms. For example, the milk flow sensor may be electronic or mechanical, with the mechanical devices being float devices or valve means or diaphragm means.

Such detaching systems are improvements as compared to manual operation where vacuum is shut off and the cups are removed by an operator. Sensing the milk automatically and shutting the vacuum off prior to detachment saves labor, eliminates "over-milking" and minimizes irritation of the teats. The present invention relates to an improved combination milk flow sensing and cut-off device that can be used as an improvement to any of the conventional detaching systems known in the art.

With teat cup detachers utilizing electronic control circuitry to monitor the flow of milk from the cups, the sensing of the milk flow is accomplished by accumulating milk in a small orificed receptacle from which the milk slowly drains. Electric current is passed through the milk to detect its presence. When the flow ceases, the receptacle gradually becomes empty thereby terminating the electric current. Upon termination of the current the detachment function is actuated. This type of device is disadvantageous because it adds electricity to an already moisture-laden environment. Electrical shocks, both to the milking animal and to the operators may result. Furthermore, the orifices used in such devices easily clog and in this regard it is notable that milk generally contains at least partially congealed particles. Proper functioning of the sensitive equipment then requires frequent cleaning of the orifices. Finally, it is difficult to provide devices of this general type that are capable of sensing lower flow rates. This insensitivity may result in the milking process being terminated before the animal has been completely milked out.

Reisgies, U.S. Pat. No. 3,991,716, describes an automatic teat cup detaching apparatus which operates entirely pneumatically without electrical control circuitry. As noted by Reisgies, the pneumatic device may operate without the use of electrical circuitry and consequently is highly reliable and does not present the possibility of electrical shocks. Further, a flow sensor can be provided which can detect very low flow rates and which does not require a restrictive orifice and thus is not subject to clogging. The Reisgies detacher is adapted to operate with air under pressure which is commonly available in milking parlors.

The present invention offers an advantage to both types of automatic detachers and to others as well, such as those utilizing float type sensing devices. In fact, the present invention may be advantageously utilized with any system of automatic take off. For the sake of convenience, though, the present invention initially will be described with reference to pneumatic systems such as that described in the Reisgies patent, wherein a pneumatically activated drive means is provided to draw the teat cups away from the udder when the means are supplied with air under pressure. In the Reisgies invention a milk flow shut-off valve, responsive to air under pressure, is connected in the milk line. When pressure is directed to the valve, milk flow in the line is shut off and subsequently the vacuum to the teat cups is also shut off. Reisgies utilizes a pneumatic control which includes a milk flow sensor in the milk line to sense when the milk flow has substantially stopped and to provide air under pressure to the drive means and to the milk flow valve, a selected period of time after milk flow has subsided. Providing the air under pressure to the drive means and to milk flow valve, a period of time after the subsidance of milk flow, provides a time delay to insure that the cow has been completely milked out and has not simply paused or temporarily stopped milking. The time delay in Reisgies may be adjusted so that it is brief enough that there is no possibility of over-milking and causing injury to the teats of the cow, but at the same time long enough to assure complete milking. In Reisgies all the control functions are accomplished with pneumatic components which are notably highly reliable and which present little danger of contamination to the milk.

The present invention represents an advantage to completely pneumatic operations as well as those other automatic detaching operations known in the art. The present invention is specifically directed to an improved combination milk flow sensing and vacuum shut-off device comprising the following units; (1) a housing defining a milk flow cavity with an inlet port through which milk can flow in freely as it comes from teat cups and an outlet port of sufficient size such that milk can flow freely out of the milk flow cavity and not accumulate therein; (2) a plunger within the milk flow cavity and suspended by means of a stem extending out of the milk flow cavity and attached to and operated by an air pressure cylinder piston unit in such a relationship that the cylinder piston unit drives the stem and plunger vertically within the milk flow cavity so that the cut-off plunger may engage with the seat of the milk flow outlet port to cut off milking vacuum or to disengage with the seat of the outlet port to admit the milking vacuum; (3) a milking sensor pedal within the milk flow cavity and suspended directly beneath the inlet port by means of a pivotally mounted rocker shaft assembly comprising a pivotally mounted pedal shaft extending through the wall of the cavity to support the pedal; a counter weight assembly attached to the end of the pedal shaft and mounted outside of the cavity to pivot with the motion of the sensor pedal and pedal shaft as the pedal is activated by flow from the inlet port; (4) a valve closure member attached by means of a flexible member to the top of the pivotally mounted rocker shaft assembly so that the inflections of the milk sensor pedal transfer a resulting pivotal rocking motion by means of the shaft assembly and the flexible member to cause the closure member to move and periodically open and close. Additionally, in one embodiment of the present invention, the rocker shaft assembly may be provided with a stop to impede the pivotal movement of the counter weight assembly in a vertical direction below the horizontal so that the sensing unit may sense only a forward flow of milk, as will be described in detail below. In this manner the pedal and rocker shaft assembly "homes" when not activated by flow against the pedal from above. In this position the pedal will not be activated by back flush. In this embodiment, the milk flow sensing and vacuum shut-off device additionally comprises a stop located within the arc of motion transcribed by the rocker shaft assembly when the milk sensor pedal is activated by milk flow so as to restrict the arc of motion of the rocker shaft assembly to prohibit the milk sensor pedal from activating upon impingement of milk back flush from the outlet port of the housing. This embodiment represents a significant advantage over all of the prior art sensing devices as will be described below.

Some of the other advantages of the present invention as compared to the prior art include the following. The present apparatus operates entirely without the need for electric current. The sensor is reliable and does not create an environment combining electricity and moisture. There is no risk of electrical shock to either workers or to the cows. Further, the present sensor utilizes no orifice device; therefore, there is no plugging or over milking problem as with such prior art apparatus.

Prior art devices utilizing floats are difficult to clean in place. The present invention does not utilize a float and therefore does not present this disadvantage.

The present sensor does not utilize milking vacuum to detach the milking apparatus as do some prior art devices. Most prior art devices cut off the vacuum to the milking cow by pinching the milk hose. This causes the hose or tube to wear at this point finally restricting the milking vacuum or failing. The present invention utilizes an internal vacuum shut-off plunger in combination with an outlet port to shut off the vacuum thereby overcoming this disadvantage.

Certain of the prior devices may not be used by mounting for low line milking. What is meant by this is that either a low line or a high line may be used with milking machines. It is preferable to utilize a device that may work in conjunction with a low line since this minimizes the amount of vacuum necessary to move the milk and decreases the stress on the cow. Some of the prior art devices, particularly those utilizing pendulum-type sensors, may not be low mounted because the device must be utilized in conjunction with the pinch-off type vacuum cut-off. Finally, the present invention is advantageous over the pendulum and similar type sensing devices because, again as will be described in detail below, it will not sense in reverse. That is, during the milking process the milk is extracted from the cow in a pulsating manner so that the milk flows through the lines in "slugs". Between forward pulsations these slugs move backward some short distance causing what is called "backflush". Some sensing devices used in the art sense this backflush as a positive milk flow thereby causing inaccuracies in the signals sent by the device to the other conjunctive apparatus that depend upon the sensing device to determine their operation. This may cause an oversensing so that the device reads a milking signal when in fact positive milking has ceased and the device is merely reading backflush. The present sensor cannot oversense by sensing in reverse.

These and other objects and advantages of the invention will become readily apparent as the following description is read in conjunction with the accompanying drawings wherein like reference numerals have been used to designate like elements throughout the several views.

FIG. 1 is a perspective view of a typical teat cup detaching apparatus utilizing the combined sensing and shut-off device of the present invention.

FIG. 2 is a part schematic, part perspective view in detail of the system of FIG. 1.

FIG. 3 is a cut-away, side elevation of the combined sensing and cut-off device of the present invention.

FIG. 4 is a cut-away top view of the device.

FIG. 5 is a side elevation of the pedal, shaft, counter weight assembly, valve, valve closure member and flexible member in combination and illustrates the action of milk flow sensing.

Referring now more particularly to the drawings wherein like numerals refer to like parts in all views, the teat cup cluster 10 is attached and detached from the udder of the milking cow by means of the apparatus as described including the combination sensing and cut-off device 11, pneumatic cylinder 12, air pressure accumulator 13 and restrictor 14, control valve 15 having manual push buttom 16 and pilot drive 17. The system of FIG. 1 is shown for illustration only and other modifications of milking systems may be used with the present combination sensing and vacuum shut-off. The operative air pressure is supplied to the system from a main air line 18 through feeder conduit 19. Air pressure is selectively applied by means of the pneumatic control valve 15 through conduits 20 and 21. The valve 15 receives air under pressure from the feeder conduit 19 through an input port 15a. The valve may be manually placed in a first air distribution position by depression of button 16. The valve is switchable into a second air distribution system by the air pressure sensitive pilot drive 17. The pilot drive 17 is responsive to air pressure provided to it by pneumatic line 22. In such case, the pilot drive will switch the positions of the control valve 15 only if a certain predetermined pressure is exceeded through line 22. Valve 15 has a first output port 15b connected to pneumatic conduit 20 and a second output port 15c connected to pneumatic conduit 21. When the valve 15 is in its first position the first output port 15b has air under pressure directed thereto and the second output port 15c is vented to the atmosphere. When the valve is in the second position the second output port 15c has air under pressure directed to it while the first output port 15b is atmospherically vented.

In operation, the milking machine operator depresses pushbutton 16 supplying air under pressure to the conduit 20 and the conduit 21 is vented to the atmosphere. The pressure is conveyed through conduit 20 and conduit 23 to cylinder 12 to cause the piston 24 within said cylinder to be pushed downwardly. This position of the piston operates an arm 35a which is attached to teat cup claw 10 to permit maximum extension of the arm toward the cow to permit the attaching of the claw to the cow's udder. In operation a pulsating vacuum is imparted to a divider fork (not shown) on top of claw 10 from main source line 25 by means of a pulsator 26 and vacuum pump 27. In this phase of the operation the vacuum applied to clay 10 via line 25 causes the milking of the cow and provides a flow of milk from the claw through line 28 through the combination milk flow sensing and vacuum shut-off device 11 and out of the device via 29 to receiver jar 30 and moisture trap 31. The milk is then pumped to a milk cooling tank (not shown). As the cow becomes milked out, milk flow decreases through line 28. Eventually the cow is milked to the point where only a small amount of milk is present in line 28. To continue to maintain milking vacuum for any substantial period of time after this point would overmilk the cow and could cause mastitis or other damage to the cow's teats. The combination milk flow sensing and shut-off device operates to overcome this disadvantage; its operation will be described in detail below, however, for an explanation of the overall system shown in FIG. 2, suffice it to note that as the milk flow through 28 and 29 decreases it is sensed by device 11. So long as the milk flow is maintained then the device 11 acts to "bleed off" pressure building up in the air pressure accumulator 13 through pneumatic line 32. As milk flow ceases, the combination sensing and vacuum shut off device 11 senses the decrease in flow and stops bleeding off pressure through line 32 allowing the pressure to build up in the line and in the air pressure accumulator 13, both of which are provided with air under pressure via the restrictor 14 and pneumatic line 33. The air pressure accumulator 13 is attached to pneumatic line 22. Eventually the air pressure building up in the accumulator 13 will exceed the operative pressure of the pilot drive 17 resulting in switching of the control valve 15 to its second position. In its second position line 19 is ventilated to the atmosphere thus relieving the pressure through line 23 to the cylinder 12. Additionally, the second position of the cylinder piston 15 pressurizes line 21 and, via line 34, the area below the piston 24 of cylinder 12. The combined pressurization of the air below piston 24 and the decrease of pressure above, causes retraction of the arm 35 causing the claw 10 to be pulled away from the udder of the milking animal. If this occurs while the milking vacuum is maintained, the teats of the animal may be irritated. However, this is overcome with the present invention as will be described below with reference to FIG. 3. The activation of the cut-off function of the combined device of the present invention is accomplished by the pressurization of line 20a and simultaneous evacuation of the pressure in 19a to the atmosphere as described in detail in FIG. 2.

Referring to FIGS. 3, 4 and 5, the combination milk flow sensing and cut-off device consists of a housing 36 that defines a cavity and which is provided with an inlet port 37 and outlet port 38. The inlet port is attached to milk flow line 28 leading from claw 10, while port 38 opens into milk flow line 29. A milking vacuum cylinder unit 39 is fitted at the head and suspended above the housing. The piston has an inlet pressure port 40 and inlet pressure port 41. Port 40 is attached to pneumatic line 21 while port 41 leads to pneumatic line 20. The cylinder is provided with a drive piston 42 attached to a stem 43 which leads down from the cylinder piston unit and into the cavity of the housing. The piston 42 and attached stem may be driven alternately by pressure from above from pneumatic line 21 through port 40 or upwardly from below by pneumatic line 20 through port 41. Attached to the end of the stem 43 within the cavity is a plunger 44 which is designed to fit securely within the seat of the outlet port 38. Additionally a pedal 45 is suspended within the cavity by means of a pivot shaft 46 which leads through the wall of the cavity at 47 to a pivot point 48 outside of the device housing. The shaft 46 is pivotally attached at the point 48 to rock with the motion of the pedal 45. Correspondingly pedal 45 is positioned immediately below the flow of milk from milk flow line 28 into the housing cavity through port 37 to operate in a rocking motion upon impingement of the flow of milk against the pedal. As the pedal is activated it is depressed downwardly causing shaft 46 to pivot at set pivot point 48. The shaft is equipped with a counter weight assembly 49 that lies in a horizontal plane with the shaft 46 when the device is at rest and unactivated by milk flow. The rest position of the counter weight assembly 49 is accomplished by seating against stop 50 which prohibits the assembly 49 from movement below the horizontal plane thereby restricting the movement of the pedal in a direction upwardly from a horizontal plane. When pedal 45 is not activated by milk flow from line 28 it is returned along with the counter weight assembly 49 to the horizontal position by means of a counter weight 51 attached to the end of the assembly 49. A valve closure member 42 is provided at the end of line 32 and is attached by means of a flexible member 53 to the top of the pivotally mounted shaft 46 so that the flexions of the sensor pedal 45 are transmitted in a rocking motion along the shaft 46 by means of the point of pivot 48 and are transmitted through the flexible member 53 so that the valve member 52 is caused to periodically open and close with the activation of the flexible member 53.

The combination milk flow sensing and shut-off device operates as follows: As the piston 15 is activated by means of manual control 16, pressure is transmitted via line 20 through port 41 to cylinder piston 42, which is caused to move in an upward direction to disengage plunger 44 from the seat of port 38. As the plunger 44 is so disengaged, reduced pressure (vacuum) passes through line 29 into the cavity of the housing and through port 37 is transmitted via line 28 to the milking claw 10. Simultaneously piston 24 is activated permitting extension of the claw 10 for attachment to the cow. Upon attachment, the milk flow vacuum begins to draw milk by means of the claw 10 through milk line 28 and into the cavity of the sensing housing 36. The milk enters through port 37 and impinges upon the suspended pedal 45 thereby activating the rocking motion of the shaft 46. So long as this motion is continued by impingement of milk slugs, it is transmitted by means of flexible member 53 to valve 52 to periodically open and close 52. As valve 52 is periodically opened and closed, it periodically vents the pressure in line 32 to the atmosphere. So long as the pressure through line 32 is vented to the atmosphere, pressure does not buld up in accumulator 13.

As milk flow begins to slow, its effect on the pedal 45 diminishes and concurrently the opening of valve 52 to the atmosphere decreases in fequency causing a build up of pressure in line 32 and subsequently in the accumulator 13. At some point the frequency of activation of the pedal 45 will sufficiently decrease and the venting of valve 52 will sufficiently decrease so that the pressure in 13 will reach a point where it will activate pilot drive 17 causing the piston in cylinder 15 to be driven to a second position which will vent the pressure in line 20 to the atmosphere. At the same time pneumatic pressure will be directed through lines 21 and 34 to cylinder 12 and additionally to cylinder 39 via line 21 and port 40. As line 21 is pressurized the drive cylinder 39 is activated causing piston 42 to move downwardly to move plunger 44 into a closed position with the seat of port 38, thereby cutting off milking vacuum to the claw 10 that previously had been transmitted by line 29 into the housing cavity 36 and thence to line 28. At the same time, pressure in line 34 activates piston 24 of cylinder 12 to permit the withdrawal of claw 10 from the milking animal.

One of the unique advantages of the present invention is the versatility of the sensing device. Thus with a slight modification, the device may be used by an electronic milking machine as well as pneumatically operated machines. For example, with reference to FIG. 3, the valve member 52 and flexible member 53 may be replaced by a switch to electronically maintain pressure in the system until the sensing of completion of milk flow.

What is claimed is:

1. In an apparatus for detaching milking teat cups and associated milk line from the udder of an animal after the animal has substantially stopped providing milk, the improvement of a combined milk flow sensing and vacuum shut-off device comprising:
   (A) a housing defining a milk flow cavity with an inlet port through which milk can flow freely as it comes from the teat cups and an outlet port of sufficient size that milk can flow freely out of the milk flow cavity and not accumulate therein;
   (B) a plunger within the milk flow cavity suspended by means of a stem extending out of the cavity and attached to and operated by a milking vacuum cylinder piston unit in such a relationship that the piston unit drives the stem and plunger vertically within the milk flow outlet port to cut-off milking vacuum and disengage the seat of the port to admit said vacuum;
   (C) a milk sensor pedal provided within said cavity and suspended directly beneath the inlet port by means of a rocker shaft assembly;
   (D) said rocker shaft assembly comprising:
      (i) a pivotally mounted pedal shaft attached to said pedal and extending through the wall of said cavity;
      (ii) a counter weight assembly attached to the end of the pedal shaft outside of the cavity to pivot with the motion of the pedal shaft as it moves with said sensor pedal, as said sensor pedal is activated by milk flow from said inlet port;
   (E) a valve closure member attached by means of a flexible member to the top of the pivotally mounted rocker shaft assembly so that deflections of said milk sensor pedal transfer a resulting pivotal rocking motion through said rocker shaft assembly, and said flexible member to cause said valve closure member to activate and deactivate by opening and closing;
   (F) pneumatic control means and control valve adapted to respond to said valve closure member and to control said plunger whereby upon continued activation of said valve closure member, said plunger is maintained in an open position and upon diminishing activation of said closure valve, said plunger is caused to be driven vertically within the milk flow cavity to engage the seat of the milk flow outlet port to cut-off the flow of milking vacuum.

2. The apparatus of claim 1, additionally comprising a stop located within the arc of motion transcribed by the rocker shaft assembly when said milk sensor pedal is activated by milk flow so as to restrict the arc of motion of the rocker shaft assembly to prohibit the milk sensor pedal from activating upon impingement of milk back flush from the outlet port of said housing.

3. A combination milk flow sensing and vacuum shut-off device comprising a housing defining a milk flow cavity with an inlet port through which milk can flow in freely as it comes from the teat cups and an outlet port of sufficient size such that milk can flow freely out of the milk flow cavity and not accumulate therein; a plunger within the milk flow cavity suspended by means of a stem extending out of the cavity and attached to and operated by a milking vacuum cylinder piston unit in such a relationship that the piston unit drives the stem and plunger vertically within the milk flow cavity so that the cut-off plunger engages with the seat of the milk flow outlet port to cut off the flow of milking vacuum and disengages with said seat to permit the flow of said vacuum, a milk sensor pedal provided within said cavity and suspended directly beneath the inlet port by means of a pivotally mounted rocker shaft assembly; said pivotally mounted rocker shaft assembly comprising a pedal shaft extending through the wall of the cavity, a counter weight assembly attached to the end of the pedal shaft and mounted outside of said cavity to pivot with the motion of the sensor pedal and pedal shaft as said pedal is activated by flow from said inlet port; a valve closure member attached by means of a flexible member to the top of the pivotally mounted rocker shaft assembly so that the flexions of the milk sensor pedal transfer a resulting pivotal rocking motion through said rocker shaft assembly and said flexible member to cause the closure valve to open and close, means adapted to respond to said valve closure member and to control said plunger whereby upon continued activation of said valve closure member, said plunger is maintained in an open position and upon diminishing activation of said closure valve, said plunger is caused to be driven vertically within the milk flow cavity to engage the seat of the milk flow outlet port to cut off the flow of milking vacuum.

4. The apparatus of claim 3, additionally comprising a stop located within the arc of motion transcribed by the rocker shaft assembly when said milk sensor pedal is activated by milk flow so as to restrict the arc of motion of the rocker shaft assembly to prohibit the milk sensor pedal from activating upon impingement of milk back flush from the outlet port of said housing.

5. Apparatus for pneumatically detaching the milking machine teat cups and associated milk line from the udder of an animal after the animal has substantially stopped providing milk, comprising:
   (A) drive means operably connected to said teat cups for drawing said teat cups away from said udder when said drive means is supplied with air under pressure;
   (B) pneumatic control valve adapted to receive air under pressure to activate said control valve, said control valve upon such activation providing air under pressure to activate said drive means; and
   (C) a combination milk flow sensing and vacuum shut-off device comprising a housing defining a milk flow cavity with an inlet port through which milk can flow in freely as it comes from said teat cups and an outlet port of sufficient size such that milk can flow freely out of the milk flow cavity and not accumulate therein;
   (D) a plunger within said milk flow cavity suspended by means of a stem extending out of said cavity and attached to and operated by a milking vacuum cylinder piston unit in such a relationship that the piston unit drives the stem and plunger vertically within the milk flow cavity so that the cut-off plunger may engage with the seat of the milk flow outlet port to cut-off the flow of milking vacuum or to disengage the seat of the port to permit the flow of the vacuum, said milking vacuum cylinder piston attached to said pneumatic control valve whereby said piston is activated as said cylinder is activated;

(E) a milk sensor pedal provided within the cavity and suspended directly beneath the inlet port by means of a pivotally mounted rocker shaft assembly comprising a pedal shaft extending through the wall of the cavity, a counterweight assembly attached to the end of the pedal shaft and mounted outside of the cavity to pivot with the motion of the sensor pedal and pedal shaft as said pedal is activated by flow from the inlet port;

(F) a valve closure member attached by means of a flexible member to the top of the pivotally mounted rocker shaft assembly so that the flexions of the milk sensor pedal are transferred to impart a resulting pivotal rocking motion through the rocker shaft assembly and the flexible member to cause the closure valve to open and close; and (G) pneumatic control means adapted to receive air under pressure, said pneumatic control means including a control valve; means to allow a build-up of air pressure to activate said control valve, and means to diminish said build-up of air pressure attached to said closure valve whereby upon activation of said closure valve, said means is activated to prevent said build-up and upon diminishing activation of said control valve, to permit said build-up of air pressure to activate said control valve, said control valve upon such activation providing air under pressure to activate said milking vacuum cylinder piston of said combination sensing and vacuum shut-off device thereby causing said stem and plunger to be driven vertically to engage with the seat of the milk flow outlet port to cut-off the flow of milking vacuum, and further upon such activation to provide air under pressure to activate said drive means to draw said teat cups away from the said udder.

6. The apparatus of claim 5, additionally comprising a stop located within the arc of motion transcribed by the rocker shaft assembly when said milk sensor pedal is activated by milk flow so as to restrict the arc of motion of the rocker shaft assembly to prohibit the milk sensor pedal from activating upon impingement of milk back flush from the outlet port of said housing.

* * * * *